Oct. 10, 1967 H. C. ANDERSON ETAL 3,346,813
CONVERTER USING SPIN RESONANT MATERIAL
Filed June 26, 1964 3 Sheets-Sheet 1

INVENTORS
HAROLD C. ANDERSON
ALFRED E. SHANHOLTZER

BY Alfred B. Levine
ATTORNEY

Oct. 10, 1967 H. C. ANDERSON ET AL 3,346,813
CONVERTER USING SPIN RESONANT MATERIAL
Filed June 26, 1964 3 Sheets-Sheet 2

INVENTORS
HAROLD C. ANDERSON
ALFRED E. SHANHOLTZER

BY *Alfred C. Levine*

ATTORNEY

INVENTORS
HAROLD C. ANDERSON
ALFRED E. SHANHOLTZER

BY *Alfred B. Levine*
ATTORNEY

United States Patent Office 3,346,813
Patented Oct. 10, 1967

3,346,813
CONVERTER USING SPIN RESONANT
MATERIAL
Harold C. Anderson, Rockville, and Alfred E. Shanholtzer, Greenbelt, Md., assignors to Litton Systems, Inc., Silver Spring, Md.
Filed June 26, 1964, Ser. No. 378,363
16 Claims. (Cl. 325—448)

This invention relates to methods and apparatus for the detection and conversion of high frequency radio frequency signals, and more particularly relates to the use of spin resonant materials for separating the component frequencies of a radio signal and providing output signals of different frequencies for such purposes as display, recording or other indication of the radio signals.

It is accordingly a principal object of the invention to detect and modulate the component frequencies of a radio frequency signal by spin resonance energy transfer methods.

A further object is to provide methods for separately modulating the component frequencies of a radio signal.

A further object is to provide methods and apparatus for modulating a radio frequency signal by energy transfer.

Still another object is to provide methods and apparatus for recording or indication of a radio frequency signal.

A still further object of the invention is to superimpose a series of lower frequency modulations on a radio frequency signal.

Still a further object is to superimpose one or more different modulation frequencies on different frequency components of a radio frequency signal.

A still further object is to translate a continuous wave or pulsed radio frequency signal into a different frequency band for such purposes as detection, recording, or display of the signal.

Other objects and many additional advantages will be more readily understood by those skilled in this art after a detailed consideration of the following specification taken with the accompanying drawings wherein.

Figure 1:
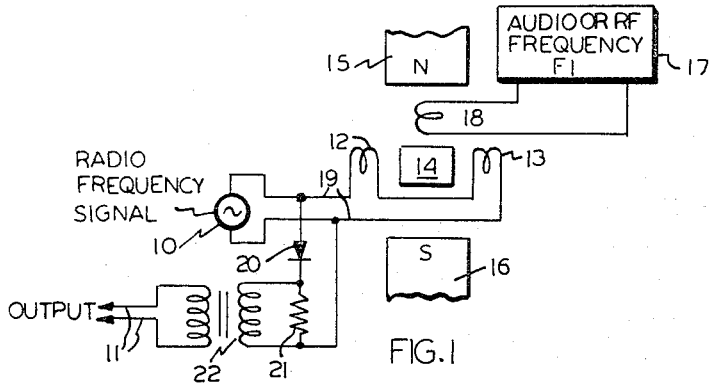
FIG. 1 is an electrical schematic drawing illustrating one manner of determining a component frequency or frequency band of a radio frequency signal according to the invention or modulatig a radio frequency signal.

Referring to FIG. 1 for an understanding of one manner of practicing the invention, there is shown a detector method for determining the presence of a given frequency component in a radio frequency input signal 10 and producing an audio frequency output signal over output lines 11 in the event that the given frequency component is contained in the radio frequency input signal 10.

As shown, the radio frequency signal 10 is initially applied over lines 19 to energize a pair of windings 12 and 13 which reproduce the signal as a radio frequency magnetic field about the windings, and apply this magnetic field to a mass of spin resonant material 14.

According to the present invention, the spin resonant mass 14 is a material containing uncoupled electrons or other subatomic particles having a magnetic dipole moment which either precess or orbit, and this material is characterized as being frequency sensitive and absorptive of energy from a radio frequency magnetic field to which the material has been frequency tuned. Where the material contains uncompensated electrons or electrical radicals, this phenomena is generally referred to as electron spin resonance, and where the material contains protons or larger subatomic particles, this phenomena is generally known as nuclear spin resonance, or simply magnetic resonance. Although the present invention is primarily concerned with the utilization of signals at microwave frequencies and therefore with electron spin resonance phenomena, it will be appreciated by those skilled in the art that the same processes and apparatus may be applied to the detection and utilization of lower frequency radio signals using nuclear resonance material.

An additional characteristic of spin resonant materials is that they are frequency sensitive and may be tuned to resonance at different frequencies or bandwidths of the radio signal by an external magnetic field that is generally referred to as the tuning field. The radio frequencies at which such materials resonate is in direct proportion to the amplitude or intensity of the tuning magnetic field according to the Lamour energy relationship.

Returning to FIG. 1, the spin resonant material 14 is tuned to resonate at a given preset frequency, or at a narrow band of frequencies, that it is desired to detect by means of an externally applied static or low frequency magnetic field being produced by the magnets or electromagnets 15 and 16 that are disposed on opposite sides of the material 14 and located at right angles to the radio frequency field produced by windings 12 and 13. The intensity of this tuning magnetic field is suitably adjusted so that the spin resonant material 14 resonates only at the narrow frequency band that it is desired to detect in the incoming radio frequency signal.

For detecting the presence of this radio frequency component, the tuning magnetic field being applied to the spin resonant mass 14 is amplitude modulated by an audio or radio frequency generator 17, hereafter referred to as a tone signal, that energizes a separate magnetic winding 18, being disposed between the magnetic poles 15 and 16, and being oriented in such direction as to aid or oppose the tuning magnetic field being produced by the magnets 15 and 16. The modulating signal 17 is at a different lower frequency band than the radio signal 10 to be readily distinguished from the radio signal 10. During positive half cycles of the modulating signal, the magnetic field being produced by winding 18 increases the amplitude of the tuning magnetic field being applied to the mass 14, and during negative half cycles of the modulating signal decreases the tuning magnetic field. Consequently, during such positive half cycles of the modulating signal the spin resonant mass 14 is tuned to respond to a higher frequency than that determined by the magnets 15 and 16 alone and during the negative half cycles of the audio wave, the mass 14 is tuned to a lower frequency than that determined by magnets 15 and 16.

Presupposing that the incoming radio frequency signal 10 contains the selected component of frequency to which the spin resonant mass 14 has been initially tuned by the magnets 15 and 16, then during each cycle of the audio frequency modulator, when the modulating signal is at zero amplitude (0°, 180° and 360°), the mass 14 resonates at the frequency component of the radio frequency source 10 and absorbs energy from the source 10.

When energy is absorbed from the incoming signal 10, the potential or voltage across lines 19 drops in the same manner as if a load were suddenly applied across these lines with the effective result that the modulating frequency signal is superimposed upon the radio frequency signal 10 across lines 19. On the other hand, if the incoming radio signal 10 does not contain the frequency component to which the mass 14 has been tuned, it does not absorb energy from the radio frequency signal 10 during any portion of the cycle of the modulating signal 17, and consequently there is no modulation signal imposed on lines 19.

For detecting the modulation signal on lines 19, a simple nonlinear detector circuit is provided including a diode 20, a resistor 21, and a transformer 22 all being coupled to lines 19 and energizing the output lines 11. This detector circuit responds to modulated radio signal 10 on lines 19 and reproduces its envelope across resistor 21 which is applied by transformer 22 to the output lines 11.

Thus in the event that the incoming radio signal 10 contains the frequency component to which the spin resonant mass 14 has been tuned by the static magnets 15 and 16, this radio signal 10 is modulated by the fixed frequency of the modulation generator 17, and this modulation signal is detected and reproduced over the output terminals 11. On the other hand, if the radio signal 10 does not contain this preselected radio frequency component, spin resonance does not occur in the mass 14 and the radio signal is not modulated by the modulating signal 17 to reproduce the modulation signal over line 11.

Figure 2:
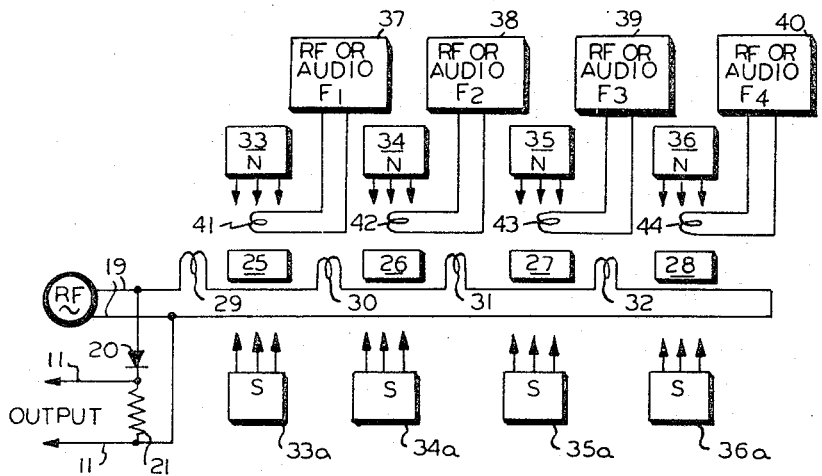
FIG. 2 is an electrical schematic drawing, similar to FIG. 1, and illustrating one manner of determining a series of component frequencies in the radio frequency signal or imposing a series of modulations on the signal.

FIGURE 2 illustrates an extension of this process for detecting four or more component frequencies in the incoming radio signal 10, and producing a series of different audio or other modulation frequency output signals corresponding to those radio frequency components that are present in the incoming radio frequency signal. It will be understood that the modulating tones or frequencies may be in the audio or radio frequency ranges and that they may be continuous or pulsed on and off.

In FIG. 2, a series of four or more separate spin resonant masses 25 to 28, inclusive, are provided, and the incoming radio frequency signal 10 is applied to each mass by means of a separate magnetic coil 29 to 32, respectively, that may be connected in series, as shown, or in parallel. As shown, each of the windings 29 to 32, inclusive, is disposed adjacent its associated spin resonant mass and in energy transfer relationship with the mass.

Each of these spin resonant masses 25 to 28, is tuned to resonate at a different radio frequency signal component than the others by applying to each such mass a different amplitude static magnetic field by means of the separate magnet poles 33 to 36, inclusive, as shown. More specifically, the mass 25 is tuned by the pair of magnet poles 33 and 33a to resonate at a first radio frequency, the mass 26 is tuned by the magnet poles 34 and 34a to resonate at a second radio frequency, and the masses 27 and 28 are tuned by magnets 35–35a and 36–36a, respectively, to resonate at third and fourth radio frequencies.

For tuning each of these spin resonant masses to resonate at a different frequency, each of the different pairs of magnet poles provides a different intensity magnetic field than the others; or if magnets of the same strength are used, the poles of each pair of magnets may be each spaced progressively further apart from their associated masses, such that each spin resonant mass receives a different intensity magnetic flux.

For detecting each of the four different radio frequency components in the incoming signal, each of the tuning magnetic fields being applied to the different spin resonant masses is modulated by a different modulating frequency signal. For modulating the mass 25, a magnet winding 41 is energized by a first signal oscillator 37 operating at a first tone frequency, the magnetic field tuning spin resonant mass 26 is modulated at a second tone frequency signal by oscillator 38, and similarly the masses 27 and 28 are each modulated by different tone frequency oscillator sources 39 and 40. In this manner there is provided a combination of a series of frequency detectors of FIG. 1, with each detector responding to a different radio frequency component and each producing a different tone frequency modulation in the output if that component is present in the incoming radio frequency signal.

In operation, this multiple frequency detection system functions in the same manner as does the single detector of FIG. 1, whereby each of the spin resonant masses 25 to 28, respectively, responds only to a different preselected radio frequency component of the incoming signal 10 to which it has been tuned, and modulates this radio frequency component at lines 19 by its related tone frequency generator. Thus, in the event that the incoming frequency radio signal 10 contains all of the frequency components to which the series of interconnected detectors have been tuned, there appears over lines 19 a series of four different tone frequency modulations corresponding to the frequencies of tone sources 37, 38, 39, and 40, all of which are passed to the detector circuit and appear in combined form over the output terminals 11.

It will now be appreciated that what is provided by the system of FIG. 2, is essentially a signal separation process wherein an incoming radio frequency signal 10 is detected by means of a series of spin resonant masses 25 to 28 to determine its frequency spectrum, and a series of different tone frequency modulations are superimposed on this signal to indicate those of the frequency components that are contained with the incoming signal 10.

The combination of audio frequency signals being produced at the output 11 of the detector, may be easily separated from one another by means of a series of tone frequency filters (not shown) or by other means well known to those skilled in the art, and thence may be recorded, indicated or displayed as desired. If the tone frequency modulators employed are in the audio frequency band, the tone signals may be recorded on magnetic tapes or by other low frequency recording process, or may be merely passed to ear phones and/or a loud speaker for enabling an operator to listen to and detect the different audible tones, if desired.

Figure 3:
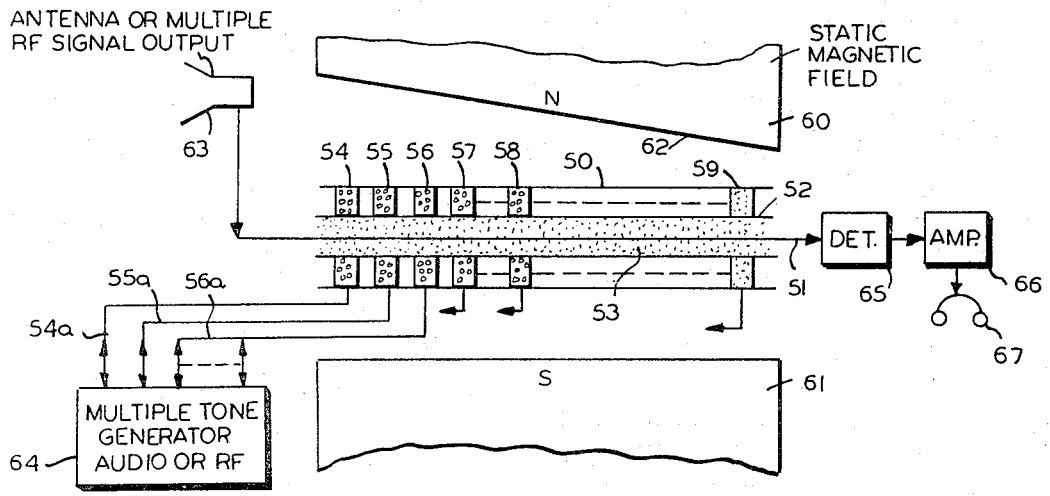
FIG. 3 is a diagrammatic view, partly in schematic form, and illustrating one preferred apparatus for practicing the method of FIG. 2.

FIG. 3 illustrates one preferred apparatus that may be employed in practicing the method described above in connection with FIG. 1 and FIG. 2. As shown, the modulator apparatus for receiving both the radio frequency signal 10 and the series of tone signals is preferably provided as an integral unit in the form of a small diameter elongated hollow tube 50. Concentrically disposed within the tube 50, there is provided an inner coaxial line for receiving the radio signal, and including a central conductor 51 that is disposed and spaced within an outer conducting sheath 52. Alternatively the coaxial line 51, 52 may be replaced by a slow wave helix (not shown). A spin resonant material 53 is uniformly applied within the space between the inner and outer conductors 51 and 52 of the coaxial line, or alternatively discrete areas or regions of spin resonant material may be employed at each detecting position.

Spaced along the outside of the coaxial line sheath 52, there is provided a series of modulating windings, as 54 to 59, inclusive, and these windings are preferably, but not necessarily, disposed inside the outer tube 50, as shown, to provide a compact and rigidized construction.

Instead of providing a series of separate tuning magnets, such as magnets 33 to 36 in FIG. 2, it is preferred to employ a single pair of elongated magnet poles 60 and 61 having pole faces which extend along the length of the modulated tube 50. To provide a different intensity magnetic field at each detecting position, the upper magnet pole face 62 is progressively tapered away from the modulator tube 50 along its length, to vary the air gap spacing between the magnetic pole face at each position along the length of the tube and thereby vary the magnetic flux intensity of the magnetic tuning field at each position as is desired.

The incoming radio frequency signal to be detected is received by a suitable antenna or radio frequency horn 63 and applied to the central conductor 51 of the coaxial line within the modulator tube 50. This signal produces a radio frequency magnetic field about the central conductor 51 to energize the spin resonant material 53 in the same manner as do the separate windings 29 to 32 of FIGS. 1 and 2.

For producing the different tone frequency modulations at each position in the modulator, a single multiple tone signal generator 64 is provided having a series of output terminals 54a, 55a, 56a, and the like, each which energizes a different one of a series of tone modulating windings 54 to 59, as shown. Thus, it will be seen that at each position along the length of the integral modulator unit 50, there is provided a different intensity static magnetic field from the magnets 60 and 61, and a different tone frequency modulating winding 54 to 59, whereby the integral modulating unit provides a series of frequency detecting positions in the same manner as does FIG. 2, to respond to and modulate each of the frequency components of the incoming radio frequency signal.

In operation, the system of FIG. 3 functions in the same manner as described above whereby the incoming radio signal from the antenna or horn 63 energizes the central conductor 51 to apply the radio frequency magnetic field to the spin resonant material areas disposed along the inside of the modulator unit. At each discrete position along the length of the modulator, there is applied a different intensity static magnetic field by the magnet poles 60 and 61 whereby the spin resonant material 53 is tuned at each different position to resonate at a different radio frequency or band. At each of these detecting positions, the magnetic tuning field is modulated by a different frequency tone and therefore imposes its tone modulation on the radio frequency component to which it is tuned. For detecting the superimposed tones, the opposite end of the central conductor 51 of the modulator unit is directed to a detector 65 which separates the tone envelopes from the incoming radio signal and permits the combination of the tones to pass therethrough. These tones are then amplified by amplifier 66 and applied to ear phones 67 adapted to be worn by the operator, who by audibly distinguishing the different tones in the ear phone can determine which radio frequencies are contained in the incoming radio signal received by the antenna. As indicated above, the output of amplifier 66 may also be visually displayed on an oscilloscope or other instrument (not shown) and/or may be recorded (not shown), as may be desired.

Figure 4:
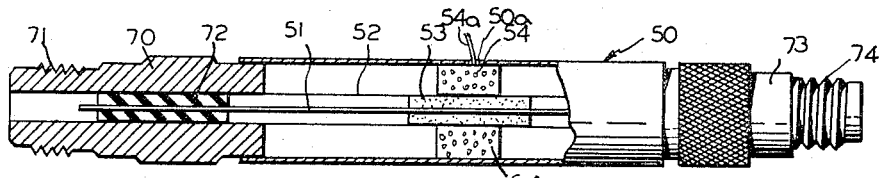
FIG. 4 is a cross-sectional view illustrating a preferred modulator apparatus according to the invention.

FIG. 4 illustrates details of a preferred construction of the integral modulator unit as discussed above in FIG. 3 and having its component parts bearing the same numbers as in FIG. 3. As shown, the modulator unit is comprised of the hollow outer tube 50 of copper or the like, that is terminated at its opposite ends in suitable male or female high frequency electrical connectors 70 and 73, which may be threaded, as shown at 71 and 74, respectively, for connection to other equipments. These three members completely enclose and integrally support all components of the modulator. Inside the hollow tube 50, a series of tone modulating windings, such as 54, are provided about the outer conductor 52 of the coaxial line; and inside the coaxial line, the spin resonant material 53 is disposed between the inner conductor 51 and the outer conductor 52. For providing electrical connections to the modulating windings, suitable openings such as 50a are provided in the outer tube 50, thereby permitting insulated conductors such as 54a, to pass through the tube 50 to the modulating winding 54. For supporting the inner conductor 51 of the coaxial line at its opposite ends, suitable dielectric sleeves 72 of Teflon or like material are provided.

In the process described above in connection with FIGS. 1, 2, and 3, it will be recognized by those skilled in the art that if the incoming radio frequency signal is received in the form of discrete pulses, or as an amplitude or otherwise modulated radio signal, this previous modulation envelope will also be detected and appear at the output terminals 19 or 51 together with the modulation provided by the tone modulating generators, and tend to obscure or confuse the desired tone signals. Additionally, spurious noise signals may appear in the output tending to give false readings or obscure the desired modulation signals. To minimize or eliminate these effects and to enable only the desired frequency intelligence to be obtained the detection methods of FIG. 5 and FIG. 6 may be employed.

Figure 6:
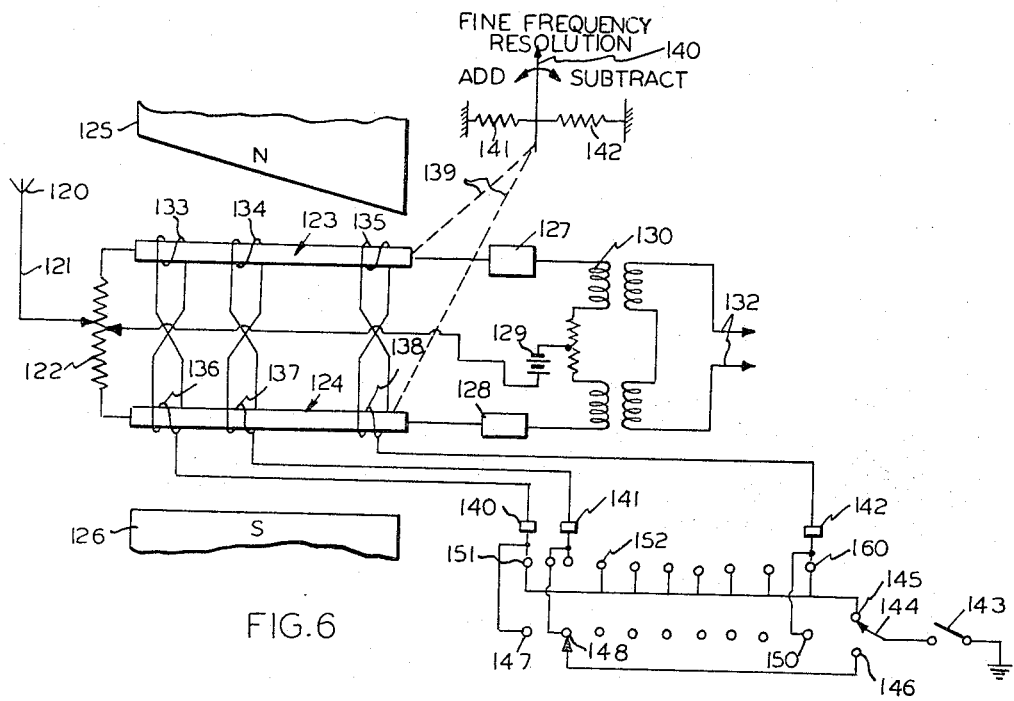
FIG. 6 is an electrical schematic drawing illustrating certain refinements of the system of FIG. 5 for more accurately resolving and detecting the component frequencies of a pulsed or continuous wave radio frequency signal, or modulating such a signal.
Figure 5:
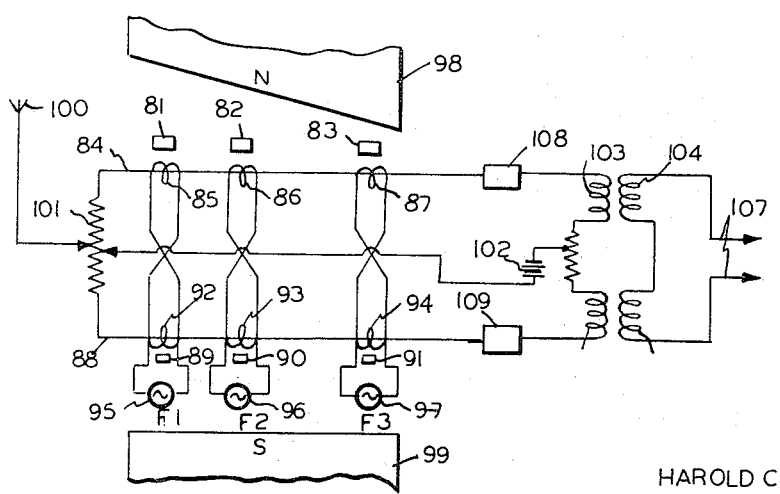
FIG. 5 is an electrical schematic drawing illustrating a differential modulation method according to the invention.

FIGS. 5 and 6 illustrate a pair of modulators that are interconnected as a differential detector that is preferred for detecting pulsed or otherwise modulated incoming radio frequency signals. In FIG. 5, a pulsed or otherwise modulated incoming signal from antenna 100 is equally applied through a high frequency coupler schematically indicated at 101 to the central conductor 84 of the upper modulator unit that applies the signal to the spaced spin resonant areas 81, 82, and 83; and to the central conductor 88 of the lower modulator unit which applies the input signal to the spaced spin resonant masses 89 to 91, inclusive. Both modulator units are similarly tuned by the nonuniform magnetic field supplied by magnet poles 98 and 99, which applies identical magnetic field intensities to corresponding detecting positions of both modulator units. At each of the detecting positions, the corresponding modulating windings of the two modulators, such as windings 85 and 92, receive the same modulating tone frequency from source 95. However, in this differential arrangement, the corresponding windings of the two modulators, such as windings 85 and 92 are oppositely poled with respect to the source 95, whereby during each cycle of the tone source 95, the upper modulator winding 85 produces an opposite polarity modulating magnetic field than the lower modulator winding 92. In a similar manner, each of the other corresponding pairs of modulating windings of the two modulators, such as 86 and 93; and 87 and 94, receive the same tone frequencies but are poled in opposite phase thereby to produce phase displaced tone modulations in the two modulator units.

The output of the upper modulator unit is directed to a unit 108, such as a diode, and thence applied to an upper transformer winding 103, biased by a potential source 102; and the output of the lower modulator unit is applied to a similar diode unit 109 and thence applied to a lower transformer winding 105 being oppositely biased by the same source potential 102.

In the absence of tone modulating signals applied to the modulating windings, the two modulator units function in a manner similar to a balanced bridge and the output transformers of the two modulators produce substantially the same signals but in opposition and no error or output signal results on lines 107. On the other hand, since the modulating windings of the two modulators are in phase opposition, whenever a radio frequency input signal is received that results in resonance in the modulators, the phase of power absorption in the two modulators is different resulting in a differential error signal across the transformer windings 103 and 105, and thereby resulting in a net output signal across the output lines 107.

When the incoming radio frequency signal is in the form of discrete, separate impulses rather than a continuous wave, this differential circuit arrangement also distinguishes the desired tone modulations from the pulse envelopes. This results from the fact that the spin resonant materials possess a further characteristic known as phase dispersion which is the same, in effect, as inductive or capacitive reactance in an R-C circuit. Since the modulating windings of the two modulator units are in phase opposition, during each half cycle of the modulating tones, the incoming pulsed radio frequency signal is applied to spin resonant masses functioning as a capacitive reactance in one modulator unit and functioning as an inductive reactance in the other.

The radio signal current passing through the inductive modulator unit is retarded in phase by the inductive appearing spin resonant masses while the signal current passing through the capacitive modulator unit is advanced in phase by the capacitive appearing spin resonant masses. Consequently the current that lags causes a reduction in magnetic flux through one output transformer such as 103 while in the other transformer 105 the flux is increasing. Since the two transformers are connected in phase opposition by the bridge circuit, the net result is that the two transformers function in aiding relationship to produce a signal across output 107 the same as if a continuous wave input were present.

In the circuitry of FIG. 5, the blocks labeled 108 and 109 may be merely diodes. The potential source 102 is preferably selected to have a voltage that is greater than twice the peak of the voltage of the incoming signal appearing on lines 84 and 88 for the purpose of forwardly biasing these diodes to eliminate the generation of higher harmonics. If the bias voltage 102 is made zero, the detector diodes 108 and 109 operate sequentially due to the phase delay in the two modulator units with first diode 108 conducting to energize transformer 103, and then diode 109 conducting to energize transformer 105. The induced voltage in the secondary windings 104 and 106 combined at output 107 would then be at twice the frequency of the incoming radio frequency signal. By forwarding biasing the diodes 108 and 109 by source 102, both the signal through the capacitive going modulator unit and the signal through the inductive going modulator unit are both passed without rectification and in aiding relationship, as discussed above, to eliminate the second order and higher order harmonics in the output 107.

The output signal appearing on lines 107 includes both the radio frequency signal and the tone modulations from the generators such as 95. For detecting the tones, a simple detector circuit, such as the diode 20 and resistor 21 of FIG. 1, may be employed. In the event that the radio signal to be detected is in the form of discrete pulses rather than a continuous wave, the different modulating tone frequencies provided by generators 95 to 97 may be at frequencies that are at least twice the incoming pulse repetition rate in accordance with the sampling theorem of information theory. As is well known to those skilled in the art, this information sampling theorem provides that where a wave envelope is to be reconstructed by sampling, the sampling rate must be at least twice as great as the highest frequency of the Fourier spectrum included in the wave shape.

According to the present invention, however, it is not necessary to reconstruct the incoming pulsed radio frequency signal at the output 107 with its modulating tones but merely to determine which ones of the modulating tones 95 to 97 are present in the output signal. For this reason, it is not necessary to employ modulating signal generators 95 to 97 operating at different frequencies that are at least twice as great as the pulse repetition rate of the incoming radio signal since the desired information may be obtained without reconstructing the pulsed wave at the output 107.

Figure 7:
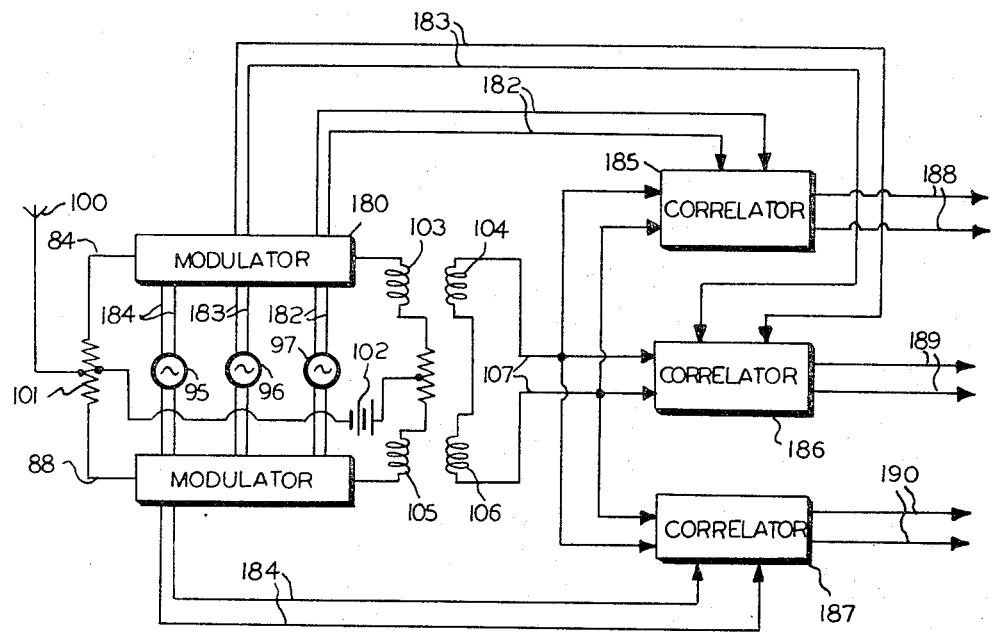
FIG. 7 is an electrical block diagram illustrating one manner of detecting the modulations in the method of FIG. 5.

One preferred manner in which this may be accomplished is by correlating the output signal over lines 107 against the modulating tone signals 95 to 97 and thereby determining which ones of the tones are present in the output. FIG. 7 is a block diagram showing one manner of performing this correlation to distinguish the tone modulations in the output 107 of FIG. 5.

Referring to FIG. 7, the output signal derived over lines 107 from the differential modulator unit of FIG. 5 is directed to a plurality of correlators 185, 186, and 187. Correlator 185 is also energized over lines 182 by the tone modulator signal from generator 97 and similarly correlators 186 and 187 are additionally energized by modulation generators 96 and 95 over lines 183 and 184, respectively. In each correlator, the output signal over lines 107 is compared by conventional correlation techniques with its corresponding modulation signal and in the event that the output contains the modulation tone, the correlator produces a signal indicating this condition.

Thus in the event that the output lines 107 of the differential modulator pass a signal containing the modulating tone 97, a signal is produced over lines 188 from correlator 185 indicating this condition, and similarly signals are produced over output lines 189 from correlator 186 and output lines 190 from correlator 187 in the event that the modulator output contains their respective modulation tones.

Figure 8:
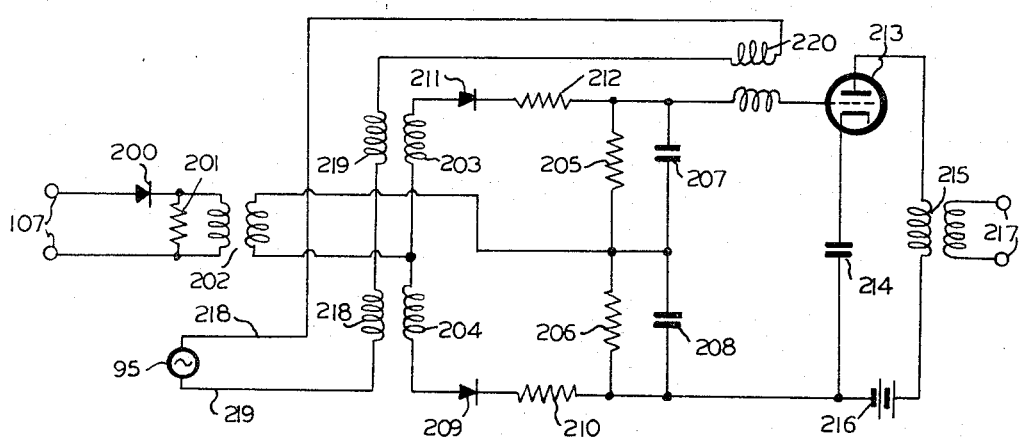
FIG. 8 is an electrical schematic drawing illustrating a correlation circuit that may be employed in the method of FIG. 7.

FIG. 8 illustrates one preferred correlator in the form of a synchronous phase detector that may be employed for this purpose.

Referring to FIG. 8, the output signal obtained from lines 107 is initially detected by diode 200, resistor 201 and transformer 202 to remove the radio frequency carrier component and pass the modulation envelope. This modulation envelope signal is then applied to a bridge circuit including oppositely poled windings 203 and 204. The modulating tone, such as tone 95, to be correlated with the output envelope from lines 107 is applied to series connected reference windings 218, 219 and 220 with winding 218 being inductively coupled to bridge winding 204 and winding 219 being inductively coupled to bridge winding 203. In the bridge, the phase of the modulating tone is compared with the envelope of the signal obtained from output 107 and if correlation exists, the bridge produces an output at the same frequency as the tone to energize vacuum tube amplifier 213 which amplifies and reproduces the tone at output transformer 217. On the other hand if the radio signal on lines 107 does not contain the modulating tone 95, no such output signal is obtained at the correlator output 217.

Although a series of the correlator circuits of FIG. 8 may be employed as shown in FIG. 7, a single correlator circuit may alternatively be used for detecting each of the modulating tones in sequence by employing a multiple position switching means for selectively connecting each of the tone signals to the correlator. It will also be appreciated by those skilled in the art that many other forms of correlation circuits and devices are known and may be employed for this purpose.

In FIG. 6 there is disclosed a further modification for determining the frequency of a specific signal component in the incoming radio signal with greater accuracy, or alternatively employing a detector with fewer tone coils 133, 134, and 135. This is performed by providing mechanical means for adjusting the positioning of the modulator within the static magnetic field provided by magnets 125 and 126 and thereby adjustably varying the tuning of each position on the modulator to maximize the tone frequency being produced at the output in response to its detected frequency. For example, presupposing that the incoming radio signal from antenna 120 contains only one frequency component which renders the modulator resonant at the positions occupied by tone windings 134 and 137. In this case, at the output lines 132 there is produced a single tone signal corresponding to that produced by the tone generator 141 energizing the tone windings 134 and 137. However, if this single incoming radio frequency were at a different frequency rendering the modulator resonant at a different position where no one of the tone coils were present, such as at a position in between adjoining windings 133 and 134, then either no tone signal would be produced at the output 132 or a very weak signal from either of tone generators 140 or 141. To maximize this output signal and more precisely identify the incoming radio frequency component, a mechanical linkage 139 and lever 140 is provided to reciprocally move the modulator units 123 and 124 with respect to the fixed magnets 125 and 126. Thus, moving the pivoted lever 140 to the right or left changes the position on the modulators that are rendered resonant to the single incoming radio frequency component until the modulator is resonant at the positions occupied by either of coils 134 or 133. When this occurs, the tone signal at the output is at maximum amplitude. The pivotable lever 140 is normally centered by opposing springs 141 and 142 and coupled to an indicator (not shown) whereby the operator may determine by the combined output tone signal and the reading of the indicator on lever 140 (not shown) the precise frequency component of the incoming radio signal.

It will also be appreciated at this point that this mechanical adjustment of the modulator in the magnetic field enables a fewer number of tone windings and tone generators to be used, since any position along the length of the modulator may be made resonant to an incoming radio signal within the bandwidth of the modulator.

As an alternative manner of fine tuning or adjustment, the static magnetic field at each position along the length of the modulator may also be varied by mechanically adjusting the axial displacement between the poles 125 and 127, bringing them closer together or further apart (not shown) or alternatively employing electrical windings (not shown) on the poles 125 and 126 and adjustably varying the current flow therethrough thereby to adjust the strength of the magnetic field.

For the purpose of more clearly distinguishing the different tone signals at the output 132, an electrical switching means is also provided, as shown in FIG. 6, for the purpose of selectively energizing and deenergizing the different ones or different groups of the tone generators 140, 141, 142 and the like thereby to selectively eliminate or add one or more tone signals in the output 132.

Referring to FIG. 6, this switching is performed by a pair of commutator switching channels interconnecting the tone signal generators 140, 141, 142 with the modulating windings 136, 137, and 138 together with a selector switch 144 for determining whether a group of tone signals are applied to the modulator or only one preselected tone. When the selector switch 144 is connected to its upper terminal 145 the starting switch 143 is closed, it is noted that both tone signal generators 140 and 142 are connected in circuit to energize modulating windings 136 and 138 respectively, whereas tone generator 148 is not in circuit and winding 137 is therefore not energized. The modulator output 132 in this case will contain the tones of only generators 140 and 142 in the event that radio frequency components corresponding thereto are included in the incoming radio signal.

By placing selector switch 144 in its downward position against contact 146, on the other hand, only tone generator 141 is placed in circuit to energize modulating winding 137 and tone generators 140 and 142 are disengaged from the circuit. The commutator switching contact 148 is selectively movable over the lower bank of contacts 147 to 150 to engage any one of the desired tone generators 140 to 142 and simultaneously disengage only the selected tone generator from the upper bank of contacts 151 to 160. Thus by the use of the switches 148 and 149 any desired one of the tone generators may be individually placed in circuit to alone energize the modulator or alternatively all generators except the selected generator may be placed in circuit to energize the modulator.

Although but a limited number of preferred embodiments of the invention have been illustrated and described, many other variations may be made without departing from the spirit and scope of this invention. Accordingly, this invention is to be considered limited only by the following claims.

What is claimed is:

1. A method for converting a time varying radio frequency signal into a time varying signal at a different bandwidth of frequencies comprising: applying the radio frequency signal to a series of displaced areas of spin resonant material, magnetically tuning each of said areas by a different intensity mganetic field to absorb energy from the radio frequency signal at a different component frequency thereof, modulating each of the different intensity magnetic fields at a different modulating frequency, and detecting the radio frequency signal after its application to said areas of spin resonant material to determine the different modulating frequencies.

2. A method for modulating a radio frequency signal comprising: applying the radio frequency signal to a spin resonant material, tuning the spin resonant material into energy absorbing relationship with the signal, modulating the magnetic field applied to the spin resonant material at a modulating frequency, thereby to modulate the radio frequency signal by said different frequency signal, and detecting the modulated radio frequency signal to separate the modulating signal from the radio frequency signal.

3. A method of imposing a series of modulations on a radio frequency signal comprising: applying the radio frequency signal to a series of displaced areas of spin resonant material, magnetically tuning each of said areas into resonance with a different frequency component of the radio frequency singal, and modulating the tuning field applied to each of said resonant areas at a different modulating frequency, thereby to superimpose said series of modulating frequencies on said radio frequency signal.

4. A method of detecting the component frequencies of a radio frequency signal comprising: applying the radio frequency signal to a plurality of separate regions of spin resonant material, applying a different intensity magnetic field to each of said areas to tune each said areas into energy absorptive relationship with a different component radio frequency, modulating the different intensity magnetic fields applied to said areas by a different tone frequency, and detecting the radio frequency signal to determine the tone frequencies.

5. A method of selectively modulating different frequency components of a radio frequency signal with different modulations comprising: applying the radio frequency signal to a plurality of frequency sensitive energy absorptive regions, tuning each region to a different component radio frequency, modulating each region by a different modulating signal whereby only the radio frequency component to which each region is tuned is modulated by the modulating signal applied to that region, and combining the different component radio frequencies after modulation.

6. A radio frequency modulator unit comprising: a coaxial line having an inner and outer conductor, a spin resonant material disposed between said conductors, a modulating winding energizable by a modulating signal disposed about said outer conductor, and magnet means for producing a flux energizing said spin resonant material to tune the material into resonance.

7. In the radio frequency modulator of claim 6, a second modulator unit in mirror image relationship with said unit to receive the same intensity flux from said frequency tuning magnet means, said second unit including a modulating winding energizable by said modulating signal in phase displaced relationship with the modulating winding of said first mentioned unit.

8. In the modulator of claim 6, a plurality of modulating windings disposed about said outer conductor to energize different regions of said spin resonant material, and said magnet means producing a different intensity magnetic flux at said different regions of spin resonant material.

9. A detector for determining the radio frequency components of an input radio signal and producing a different audible tone for each component comprising: a plurality of regions of spin resonant material, tuning means for tuning each region into resonance with a different radio frequency signal component, means for applying said input signal to said regions, tone modulating means for each region for cyclically detuning each region at a different tone frequency thereby to modulate each different resonant frequency component by a different tone, and means for detecting said signal to separate the modulating tones therefrom, thereby to determine the resonant frequency components of the signal by determining the tones present after detection.

10. A differential signal resolver for pulsed radio frequency signals comprising: a pair of spin resonance modulators, magnetic tuning means for tuning both modulators into resonance with a like plurality of the same frequency components of the signal, modulating means for each modulator for cyclically detuning the resonance condition of each modulator at each of said component frequencies, said modulating means for one of said modulators being out of phase with the other, and means for differentially combining said pair of modulators to detect the frequency components of the pulsed radio frequency signal.

11. A process for modulating a radio frequency signal comprising the steps of applying the signal to a spin resonant mass, tuning the mass into resonance with the frequency of the radio signal by applying a magnetic field thereto, and varying the intensity of the magnetic field applied to the mass by a modulating signal.

12. A process for multiply modulating a radio frequency signal containing a plurality of different frequency components comprising: applying the signal in common to a plurality of spin resonant masses, tuning each of the masses into resonance with a different one of the frequency components by applying a different intensity magnetic field to each mass, and varying the magnetic field applied to each mass by a modulating signal that it is desired to modulate that frequency component.

13. A process for detecting the component frequencies of a modulated radio frequency signal comprising: applying the signal to a first series of displaced spin resonant areas, tuning each of said areas into resonance with different frequency components, modulating each of said areas at a tone frequency, applying the signal to a second series of displaced spin resonant areas, tuning each of said second series of areas into resonance with the same frequency components as the corresponding areas of the first series, modulating each of said second areas at a corresponding tone frequency as the first areas but in an out-of-phase relation to the modulation of said first areas, and differentially combining the radio signals from said first and second series of areas.

14. A method for detecting the frequency components of a radio signal comprising: applying the signal to a plurality of displaced areas of spin resonant material, magnetically tuning said areas to different resonant frequencies by a magnetic field, applying a separate modulating magnetic field to each area to superimpose a modulating frequency on said radio signal, and adjusting the resonant frequency said areas to maximize the sensitivity of said displaced areas.

15. In the method of claim 14, the step of adjusting the resonant frequency at said areas being performed by adjusting the intensity of the magnetic field.

16. In the method of claim 15, the step of adjusting the intensity of the magnetic field being performed by providing a nonhomogeneous magnetic field about said areas and displacing said areas with respect to the field to adjust the intensity of the field at said areas.

No references cited.

KATHLEEN H. CLAFFY, *Primary Examiner.*

R. S. BELL, *Assistant Examiner.*